(12) United States Patent
Hosoda

(10) Patent No.: US 9,542,551 B2
(45) Date of Patent: Jan. 10, 2017

(54) INFORMATION PROCESSING APPARATUS, INFORMATION PROCESSING METHOD, AND NON-TRANSITORY COMPUTER-READABLE MEDIUM

(71) Applicant: CANON KABUSHIKI KAISHA, Tokyo (JP)

(72) Inventor: Yasuhiro Hosoda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 14/580,844

(22) Filed: Dec. 23, 2014

(65) Prior Publication Data

US 2015/0193615 A1 Jul. 9, 2015

(30) Foreign Application Priority Data

Jan. 8, 2014 (JP) ................................. 2014-001959

(51) Int. Cl.
*H04L 29/06* (2006.01)
*G06F 21/45* (2013.01)
*G06F 21/31* (2013.01)
*G06F 21/41* (2013.01)
*G06F 21/46* (2013.01)

(52) U.S. Cl.
CPC ............ *G06F 21/45* (2013.01); *G06F 21/31* (2013.01); *G06F 21/41* (2013.01); *G06F 21/46* (2013.01)

(58) Field of Classification Search
CPC .......... G06F 21/45; G06F 21/31; G06F 21/41; G06F 21/46

USPC ........................................................... 726/18
See application file for complete search history.

(56) References Cited

U.S. PATENT DOCUMENTS

| | | | |
|---|---|---|---|
| 7,254,831 B2 * | 8/2007 | Saunders | G06F 21/41 713/165 |
| 8,024,781 B2 * | 9/2011 | Saunders | G06F 21/10 726/5 |
| 8,094,812 B1 * | 1/2012 | Tsang | H04L 9/3226 380/28 |
| 8,146,141 B1 * | 3/2012 | Grandcolas | H04L 9/0825 726/5 |
| 8,245,290 B2 | 8/2012 | Hosoda | 726/17 |
| 8,539,568 B1 | 9/2013 | Milas | 726/8 |
| 2006/0259960 A1 | 11/2006 | Kondo | 726/6 |
| 2011/0145915 A1 | 6/2011 | Gnech et al. | 726/19 |

(Continued)

FOREIGN PATENT DOCUMENTS

EP 1 426 846 A2 6/2004
JP 2006-318304 A 11/2006

*Primary Examiner* — Michael S McNally
(74) *Attorney, Agent, or Firm* — Fitzpatrick, Cella, Harper & Scinto

(57) ABSTRACT

An information processing apparatus comprises: a manual login unit configured to display a login screen, and to perform user authentication using user information input through the login screen; an auto login unit configured to perform user authentication using user information held beforehand, without displaying the login screen; a determination unit configured to determine whether or not a password included in user information of a user who is to log in is required to be changed; and a control unit configured to cause not the auto login unit but the manual login unit to perform the user authentication, in the case where the determination unit determines that the password is required to be changed.

17 Claims, 8 Drawing Sheets

(56) References Cited

U.S. PATENT DOCUMENTS

2015/0067800 A1     3/2015   Hosoda ............................ 726/6

\* cited by examiner

FIG. 5A

501 LOGIN TO DOCUMENT MANAGEMENT
- USER NAME :
- PASSWORD :
- ☑ AUTO LOGIN FROM NEXT TIME  509
- [LOGIN]

502 ■ VALIDITY PERIOD HAS EXPIRED. PLEASE CHANGE PASSWORD.
- NEW PASSWORD :
- CONFIRM PASSWORD :
- [UPDATE] [CANCEL]

503 ■ PASSWORD VALIDITY PERIOD OF ACCOUNT MANAGED BY DOCUMENT MANAGEMENT APPLICATION HAS EXPIRED. PLEASE CHANGE PASSWORD.
- USER NAME : Alice
- OLD PASSWORD :
- NEW PASSWORD :
- CONFIRM PASSWORD :
- [UPDATE] [CANCEL]

504 DOCUMENT MANAGEMENT    [AUTHENTICATION SETTING] 516

Alice'S DOCUMENT

| DOCUMENT NAME |
|---|
| DOCUMENT 1 |
| DOCUMENT 2 |
| DOCUMENT 3 |

[SCAN] [PRINT]

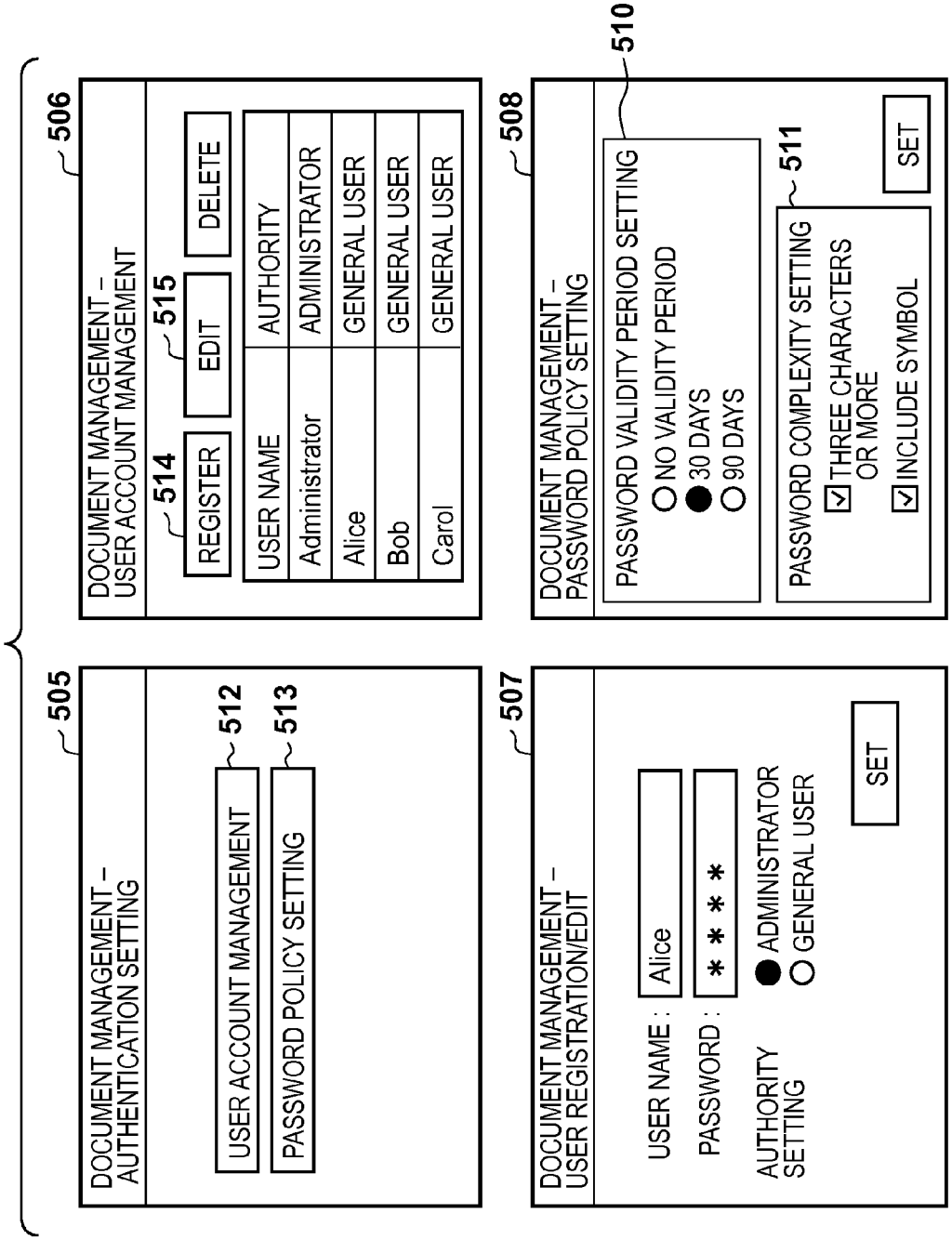

| USER NAME | PASSWORD | AUTHORITY | PASSWORD LAST UPDATE DATE AND TIME |
|---|---|---|---|
| Administrator | %#1x&a3d4rw | ADMINISTRATOR | 2013/2/1 10:00 |
| Alice | 123a | GENERAL USER | 2013/2/2 10:00 |
| Bob | abc&123 | GENERAL USER | 2013/2/3 10:00 |
| Carol | pass | GENERAL USER | 2013/2/4 10:00 |

602

```
UserA
    ├ DOCUMENT MANAGEMENT APPLICATION
    |    ├ UserName : Alice
    |    └ Password: 123a
    |
    ├ MAIL SERVER
         ├ UserName: alice@oanon.co.jp
         └ Password: 123a
```

603

| SESSION ID | USER NAME |
|---|---|
| 24d207e19651519l6f0cdfaa6b3dfa6 | Alice |
| a891e3b4a0b840e1ac74f268cbbf14e6 | Carol |

INFORMATION PROCESSING APPARATUS, INFORMATION PROCESSING METHOD, AND NON-TRANSITORY COMPUTER-READABLE MEDIUM

BACKGROUND OF THE INVENTION

1. Field of the Invention

The present invention relates to an information processing apparatus, an information processing method, and a non-transitory computer-readable medium, and particularly relates to a user password management method.

2. Description of the Related Art

An information processing apparatus such as a personal computer, a tablet, or a multi-function peripheral (MFP) having login/logout function is commonly known. Software such as an application, a database, or a website having unique login function apart from the login function when using the information processing apparatus is known, too. A user finds it troublesome to, after logging in to the information processing apparatus, perform a login operation again to use the software. Accordingly, the software having unique login function may have "auto login function" of automatically logging in to the software using information stored in association with the user information of the information processing terminal.

The software having login function is also commonly known to have a function of managing a password policy (such as password complexity and validity period) as a measure against user spoofing, for data protection (for example, see Japanese Patent Laid-Open No. 2006-318304). Such software has a function of displaying, on the display of the information processing apparatus, a screen prompting the user to change his or her login password in the case where the complexity of the password is below specified complexity or in the case where the validity period of the password is about to expire. Typically, the timing of displaying the screen prompting for the password change is immediately after the user performs a login operation using the pre-change password.

However, the following problem arises in the case of using both the "auto login function" and the "password change prompting function". For example, the timing of prompting for the password change is typically immediately after the login operation to the software. In the case where the auto login function is on, however, the user performs no login operation, and so there is no timing of displaying the screen prompting for the password change. If the screen prompting for the password change is displayed despite auto login, the user may become confused, unable to recognize where the password to be changed is managed. The user may be, for instance, unable to recognize whether the password change is for the information processing apparatus or the software.

For example, an information processing apparatus having a large display can display the login screen and the password change screen simultaneously on its operation unit, thus preventing confusion on the user. An information processing apparatus such as an MFP or a smartphone having a relatively small display is, however, not suited to display a plurality of screens simultaneously on its display.

The present invention has been made in view of the problem stated above, and enables a user to perform a password change operation without confusion even in the case where the auto login function is on.

SUMMARY OF THE INVENTION

According to one aspect of the present invention, there is provided an information processing apparatus comprising: a manual login unit configured to display a login screen, and to perform user authentication using user information input through the login screen; an auto login unit configured to perform user authentication using user information held beforehand, without displaying the login screen; a determination unit configured to determine whether or not a password included in user information of a user who is to log in is required to be changed; and a control unit configured to cause not the auto login unit but the manual login unit to perform the user authentication, in the case where the determination unit determines that the password is required to be changed.

According to another aspect of the present invention, there is provided an information processing apparatus comprising: a manual login unit configured to display a login screen, and to perform user authentication using user information input through the login screen; an auto login unit configured to perform user authentication using information input through the login screen, without displaying the login screen; a determination unit configured to determine whether or not a password included in user information of a user logging in is required to be changed; and a display unit configured to display a change screen for the password, in the case where the determination unit determines that the password is required to be changed, wherein the display unit displays a different change screen, depending on whether the login was performed by the manual login unit or the auto login unit.

According to another aspect of the present invention, there is provided an information processing method comprising: a manual login step of displaying a login screen, and performing user authentication using user information input through the login screen; an auto login step of performing user authentication using user information held beforehand, without displaying the login screen; a determination step of determining whether or not a password included in user information of a user who is to log in is required to be changed; and a control step of performing the user authentication not by the auto login step but by the manual login step, in the case of determining in the determination step that the password is required to be changed.

According to another aspect of the present invention, there is provided an information processing method comprising: a manual login step of displaying a login screen, and performing user authentication using user information input through the login screen; an auto login step of performing user authentication using information input through the login screen, without displaying the login screen; a determination step of determining whether or not a password included in user information of a user logging in is required to be changed; and a display step of displaying a change screen for the password, in the case of determining in the determination step that the password is required to be changed, wherein in the display step, a change screen is displayed, depending on whether the login was performed in the manual login step or the auto login step.

According to another aspect of the present invention, there is provided a non-transitory computer-readable medium storing a program for causing a computer to function as: a manual login unit configured to display a login screen, and to perform user authentication using user information input through the login screen; an auto login unit configured to perform user authentication using user information held beforehand, without displaying the login screen; a determination unit configured to determine whether or not a password included in user information of a user who is to log in is required to be changed; and a control unit configured to cause not the auto login unit but the manual login unit to perform the user authentication, in the case where the determination unit determines that the password is required to be changed.

According to another aspect of the present invention, there is provided a non-transitory computer-readable medium storing a program for causing a computer to function as: a manual login unit configured to display a login screen, and to perform user authentication using user information input through the login screen; an auto login unit configured to perform user authentication using information input through the login screen, without displaying the login screen; a determination unit configured to determine whether or not a password included in user information of a user logging in is required to be changed; and a display unit configured to display a change screen for the password, in the case where the determination unit determines that the password is required to be changed, wherein the display unit displays a different change screen, depending on whether the login was performed by the manual login unit or the auto login unit.

According to the present invention, a user can perform a password change operation without confusion even in the case where the auto login function is on.

Further features of the present invention will become apparent from the following description of exemplary embodiments (with reference to the attached drawings).

BRIEF DESCRIPTION OF THE DRAWINGS

FIGS. 5A and 5B are diagrams showing an example of a UI provided by a document management application.

FIG. 6 is a diagram showing an example of information recorded in an HDD.

DESCRIPTION OF THE EMBODIMENTS

The following describes embodiments of the present invention with reference to drawings.

First Embodiment

The following describes a first embodiment of the present invention.

[Network Structure]

Figure 1:
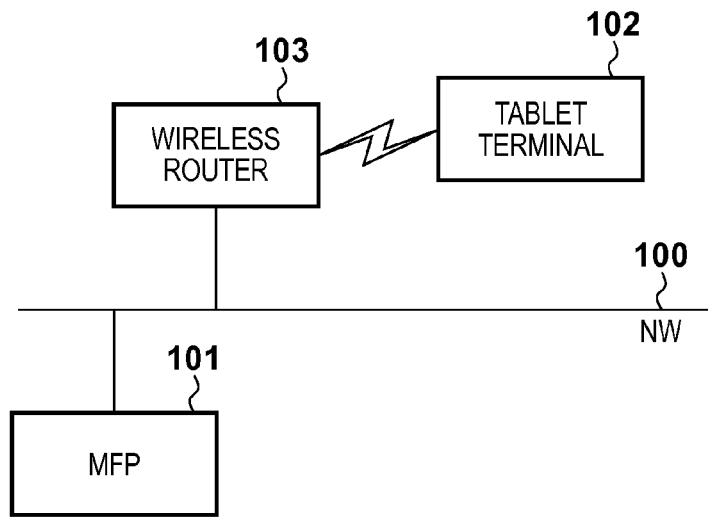
FIG. 1 is a diagram showing an example of a network structure according to an embodiment.

FIG. 1 is a simplified diagram showing a structural example of a network according to this embodiment. An MFP 101 which is an information processing apparatus and a wireless router 103 are connected to a network (NW) 100. A tablet terminal 102 which is a mobile terminal includes a network interface (not shown) for wireless LAN communication, and can connect to the NW 100 via the wireless router 103. This enables the MFP 101 and the tablet terminal 102 to communicate with each other.

Though each of the number of MFPs 101 and the number of tablet terminals 102 is one in the structural example in FIG. 1, this is not a limit, and a plurality of MFPs and a plurality of tablet terminals may communicate with each other via the NW 100.

[Hardware Structure]

Figure 2:
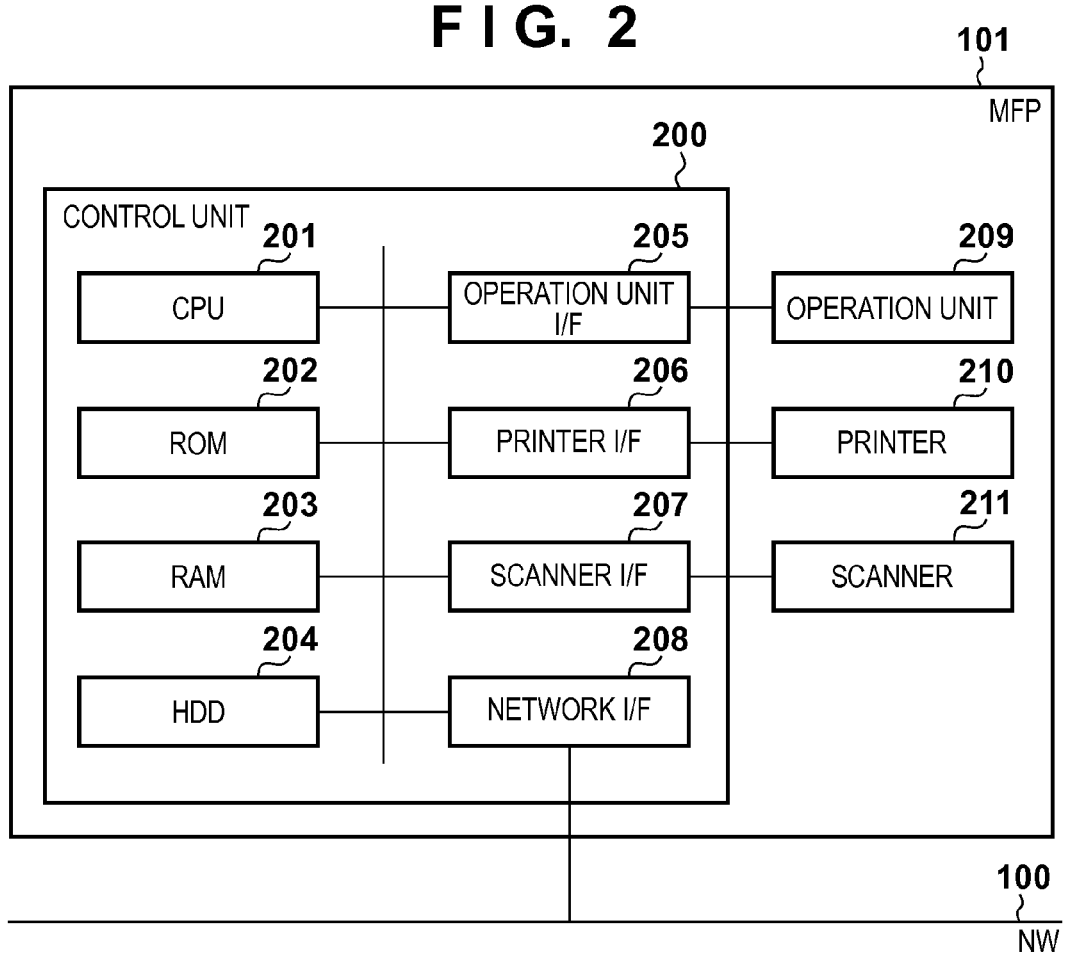
FIG. 2 is a diagram showing an example of a hardware structure according to the embodiment.

FIG. 2 is a block diagram showing a structural example of hardware of the MFP 101. A control unit 200 including a CPU 201 controls the overall operation of the MFP 101. The CPU 201 reads a control program stored in ROM 202, and controls various hardware and software included in the MFP 101. RAM 203 is a storage unit, and is used as a temporary storage area such as a main memory or a work area of the CPU 201.

An HDD 204 is a storage unit, and stores image data and various programs. An operation unit I/F 205 connects an operation unit 209 and the control unit 200. The operation unit 209 includes a display (not shown) that operates as a touch panel.

A printer I/F 206 connects a printer 210 and the control unit 200. Image data to be printed by the printer 210 is transferred from the control unit 200 to the printer 210 via the printer I/F 206, and printed on a recording medium by the printer 210. A scanner I/F 207 connects a scanner 211 and the control unit 200. The scanner 211 reads an image on an original to generate image data, and provides the image data to the control unit 200 via the scanner I/F 207.

A network I/F 208 connects the control unit 200 (the MFP 101) to the NW 100. The network I/F 208 transmits image data and information to an external apparatus (such as the tablet terminal 102) on the NW 100, and receives various information from the external apparatus on the NW 100.

The tablet terminal 102 has a hardware structure of a commonly known general-purpose tablet terminal. The tablet terminal 102 includes an operation unit (not shown) that operates as a touch panel.

[Software Structure]

Figure 3:
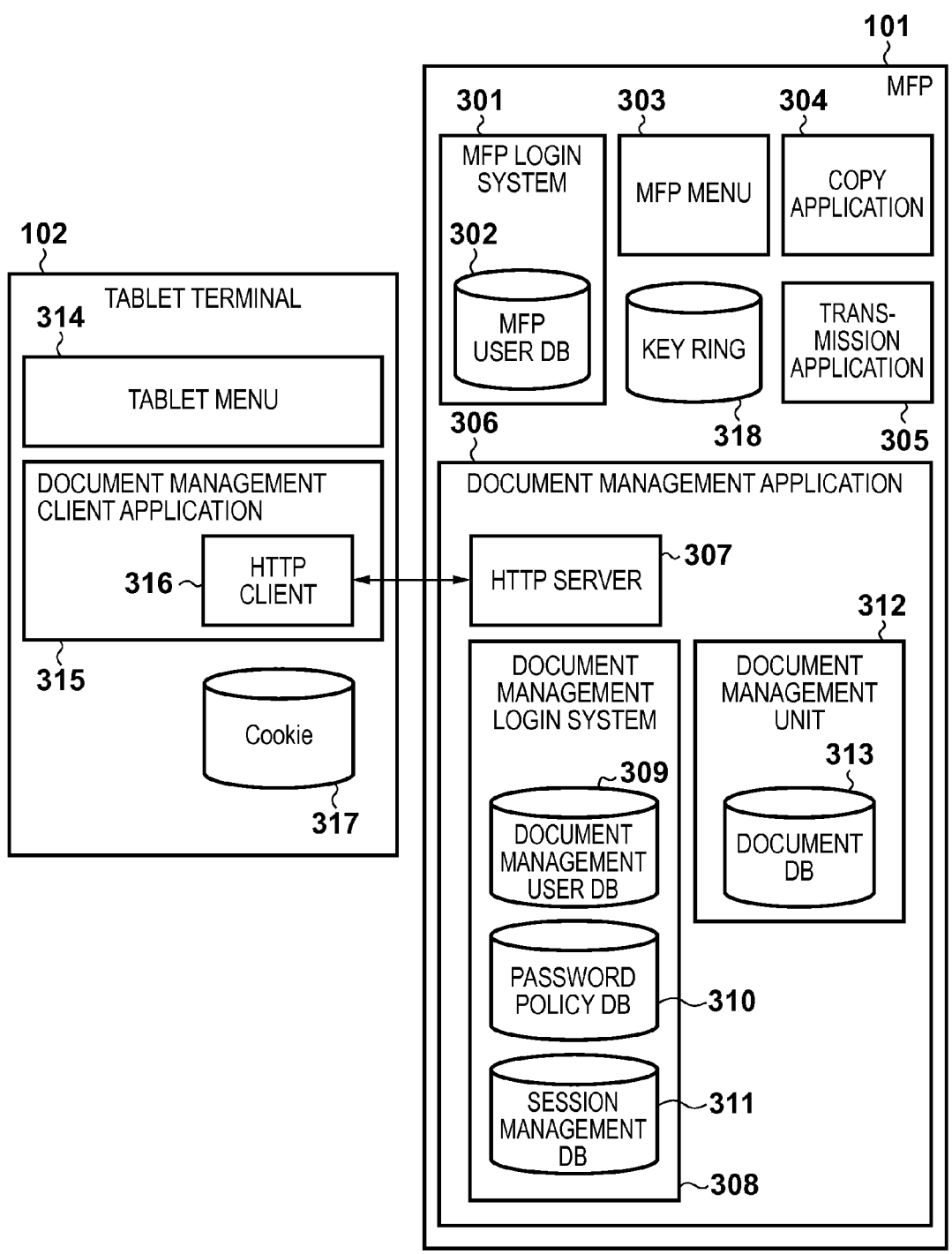
FIG. 3 is a diagram showing an example of a software structure according to the embodiment.

FIG. 3 is a block diagram showing a structural example of software of the MFP 101 and the tablet terminal 102 and a structural example of data managed by the software. The following describes the functions of the software, a user interface (UI) generated by the software, and data recorded in the HDD 204 and managed by the software.

The MFP 101 in this embodiment includes an MFP login system 301, an MFP menu 303, a copy application 304, a transmission application 305, a key ring 318, and a document management application 306. These software can use the functions of the hardware included in the MFP 101 via a device driver group (not shown) for controlling hardware. Each application is stored in the ROM 202 or the HDD 204 as a program. Upon execution, the program is loaded into the RAM 203 as work area. The following assumes that the CPU 201 executes the program corresponding to each application, unless stated otherwise.

The applications shown in the drawing are merely illustrative, and the MFP 101 may include other applications. Though the document management application 306 is used as an example here, other applications for providing auto login unit or manual login unit may be included.

Figure 4:
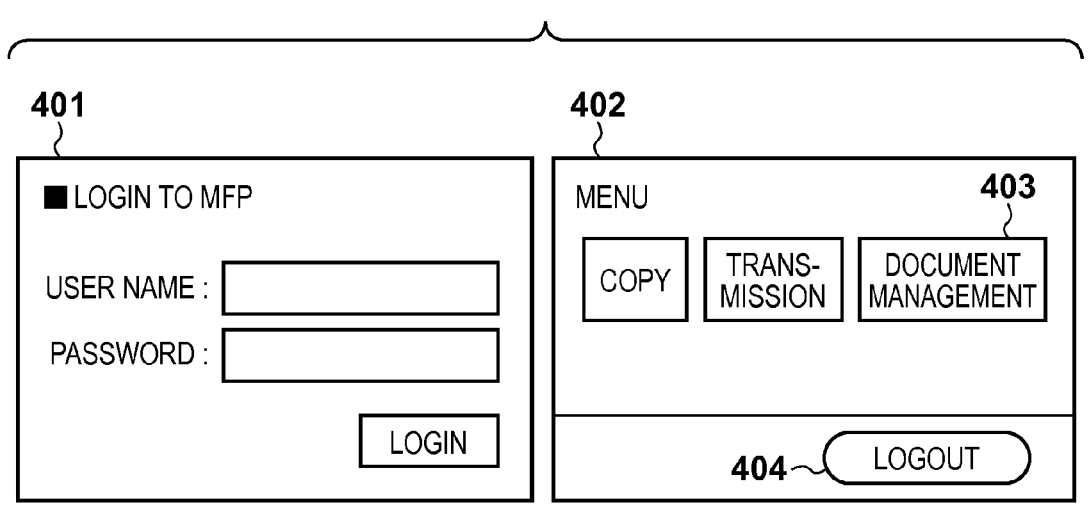
FIG. 4 is a diagram showing an example of a UI displayed on an operation unit in an MFP.

The MFP login system 301 provides login function to a user who uses the operation unit 209 in the MFP 101. FIG. 4 is a diagram showing an example of a UI displayed on the operation unit 209 in the MFP 101. The MFP login system 301 displays an MFP login screen 401 on the operation unit 209. The MFP login system 301 checks user authentication information (user name and password) input through the MFP login screen 401 against user authentication information registered beforehand in an MFP user DB 302, to perform user authentication. In the case where the user authentication is successful, the MFP login system 301 generates information of the authenticated user as MFP login user information, and notifies the MFP menu 303 of the login completion.

Upon detecting the login completion, the MFP menu 303 displays an MFP menu screen 402 on the operation unit 209. The MFP menu screen 402 includes buttons for the user to select applications to be used. In the case of detecting a button press on the MFP menu screen 402, the MFP menu 303 notifies an application associated with the corresponding button. Each application can obtain the information of the user logging in, via an application program interface (API) included in the MFP login system 301. In the drawing, the MFP menu 303 displays the copy application 304, the transmission application 305, and the document management application 306 in a selectable manner.

The document management application 306 is an application that can be used from both the operation unit 209 in the MFP 101 and the operation unit in the tablet terminal 102. The document management application 306 includes a document management login system 308, a document management unit 312, and an HTTP server 307.

The document management login system 308 functions as auto login unit and manual login unit for the document management application 306, and provides these functions. The auto login function is a function of holding user authentication information input once and performing a login process using the held user authentication information, thus enabling login without inputting the user authentication information each time the user uses the application. On the other hand, the manual login function is a function of inputting user authentication information and performing a login process each time the user uses the application.

The document management login system 308 in the document management application 306 is a login system independent of the MFP login system 301, and provides a login function for specifying a user who uses the document management application 306. Thus, in this embodiment, the login functions are classified into the login function for logging in to the MFP 101 itself and the login function for logging in to each application included in the MFP 101.

FIGS. 5A and 5B are diagrams showing a structural example of a UI provided by the document management application 306. In this embodiment, the document management application 306 can provide the same UI to the operation unit 209 in the MFP 101 and the operation unit (not shown) in the tablet terminal 102.

The document management login system 308 provides a login screen 501, authentication setting screens 505 to 508, and change screens 502 and 503 for prompting for a password change, to the operation unit 209 in the MFP 101 or the operation unit (not shown) in the tablet terminal 102. Each screen will be described in detail later. The change screen 503 will be described in a second embodiment of the present invention.

The document management unit 312 provides a document management screen 504 for performing document management which is a function provided by the document management application 306, to the operation unit 209 in the MFP 101 or the operation unit (not shown) in the tablet terminal 102. The document management screen 504 includes, for example, buttons for using a function of saving an electronic document scanned by the scanner 211 into a document DB 313 in the HDD 204 and a function of outputting an electronic document saved in the document DB 313 from the printer 210. The document management screen 504 also includes a button 516 for displaying the authentication setting screen 505 for authentication setting.

A document management client application 315 for performing HTTP communication with the document management application 306 in the MFP 101 is installed in the tablet terminal 102 beforehand. The document management client application 315 includes an HTTP client 316, and connects to the HTTP server 307 in the document management application 306. The HTTP server 307 obtains a UI described in HTML (HyperText Markup Language) or the like from the document management login system 308 or the document management unit 312 and returns it, in response to a request from the HTTP client 316.

A user who uses the document management application 306 from the operation unit 209 in the MFP 101 accesses the document management application 306 by pressing a button 403 on the MFP menu screen 402.

A user who uses the document management application 306 from the tablet terminal 102 selects a document management client button (not shown) from a tablet menu 314, to start the document management client application 315. The HTTP client 316 in the document management client application 315 connects to the HTTP server 307 in the document management application 306 the address of which is registered beforehand, and obtains HTML data. The HTTP client 316 renders the obtained HTML data, and displays the UI on the operation unit (not shown) in the tablet terminal 102.

[Authentication Setting in Document Management Login System]

The authentication setting UI screen included in the document management login system 308 is described in detail below. The authentication setting screens 505 to 508 are controlled so as to be usable only by the administrator of the document management application 306. The administrator can perform account management and password policy management of users using the document management application 306, through the authentication setting screens 505 to 508.

The authentication setting screen 505 that functions as an authentication setting menu screen displays a menu when performing authentication setting. A button 512 for user account management and a button 513 for password setting are shown in the drawing. In the case where the button 512 is pressed, the authentication setting screen 506 is displayed. In the case where the button 513 is pressed, the authentication setting screen 508 is displayed.

A list of user information registered through the authentication setting screen 507 is displayed on the authentication setting screen 506, where the registration/edit/deletion of user information can be designated. In the case where a register button 514 or an edit button 515 on the authentication setting screen 506 is pressed, the authentication setting screen 507 is displayed.

User information registered/edited on the authentication setting screen 507 for user registration/edit is recorded in a document management user DB 309 in the HDD 204. In this example, the user name, the password, and the authority are designated in association with each other. User information 601 shown in FIG. 6 is an example of user information recorded in the document management user DB 309. The password registration/update date and time is recorded and managed in the document management user DB 309 together with the information used for user authentication (information input on the authentication setting screen 507).

On the authentication setting screen 508 for password policy management/setting, a password validity period 510 and password complexity setting 511 can be specified for each user password managed in the document management user DB 309. As the password validity period 510, "no validity period", "30 days", and the like can be set. As the password complexity setting 511, conditions regarding the number of characters included in the password, the characters in the password, and the like can be set. The password policy is stored in a password policy DB 310 in the HDD 204. The setting items that can be set as the password policy are not limited to those described above. For instance, more detailed settings such as whether or not to change an initial password may be used.

[Login Process in Document Management Login System]

The login process in the document management login system 308 in the case of detecting user access from the operation unit 209 in the MFP 101 or the operation unit (not shown) in the tablet terminal 102 via the HTTP server 307 is described below. The document management login system 308 has the manual login function of displaying the login screen 501 on the operation unit 209 and the auto login function of performing the login process without displaying the login screen, as mentioned earlier. The following describes each of the manual login function and the auto login function during access from the operation unit 209 in the MFP 101 and the manual login function and the auto login function during access from the operation unit (not shown) in the tablet terminal 102. The logout process is described, too.

(Manual Login Function During Access from Operation Unit in MFP)

The document management login system 308 displays the login screen 501 to the document management application 306, on the operation unit 209. The document management login system 308 detects that the user has input the user name and the password on the login screen 501 and pressed the login button. The document management login system 308 accordingly obtains the user name and password input by the user, and checks them against the user information registered in the document management user DB 309 to perform user authentication. In the case where the user authentication is successful, the document management login system 308 records the information of the authenticated user in the RAM 203 as the information of the currently login user.

The login screen 501 includes a checkbox 509 for selecting whether or not to use the auto login function from the next time. In the case where the user instructs the checkbox 509, the login process by the auto login function using the input user name and password is permitted in the subsequent login process. In the case where the user performs login in a state where the checkbox 509 is checked, the document management login system 308 records the user name and password used in the login, in the key ring 318 in association with the information of the currently login user in the MFP 101. Information 602 in FIG. 6 is an example of information recorded in the key ring 318.

(Auto Login Function During Access from Operation Unit in MFP)

The document management login system 308 obtains the user name and password used when the currently login user logs in to the MFP 101, from the MFP login system 301. The document management login system 308 checks the user name and password obtained from the MFP login system 301 against the user information registered in the document management user DB 309, to perform user authentication.

In the case where the check fails, the document management login system 308 specifies the user from the user name used when logging in to the MFP 101 and the key ring 318. For example, in the information 602 shown in FIG. 6, the user "User A" can be specified from the user name "alice@canon.co.jp". The document management login system 308 then tries to obtain the user name and password which "User A" previously input on the login screen 501 in the document management application 306. For example, in the information 602 shown in FIG. 6, the user name "Alice" and the password "123a" can be obtained. In the case where the user name and the password are successfully obtained from the key ring 318, the document management login system 308 checks the obtained user name and password against the user information registered in the document management user DB 309, to perform user authentication. In the case where the user authentication is successful, the document management login system 308 records the information of the authenticated user in the RAM 203 as the information of the currently login user.

(Logout Process During Access from Operation Unit in MFP)

The MFP login system 301 detects that a logout button 404 on the MFP menu screen 402 has been pressed, and notifies the document management application 306 of the logout. The MFP login system 301 also discards the information of the currently login user, and displays the MFP login screen 401. When notified of the logout, the document management login system 308 in the document management application 306 discards the information of the currently login user in the document management application 306.

(Manual Login Function During Access from Tablet Terminal)

The document management login system 308 provides HTML data constituting the login screen 501, to the HTTP client 316 in the tablet terminal 102 via the HTTP server 307. The document management login system 308 detects the login operation of the user operating the tablet terminal 102, via the HTTP server 307. The document management login system 308 then obtains the user name and password input by the user on the login screen 501 formed based on the HTML data. The document management login system 308 checks the obtained user name and password against the user information registered in the document management user DB 309, to perform user authentication. In the case where the user authentication is successful, the document management login system 308 issues a session ID for storing in a cookie 317 in the tablet terminal 102 via the HTTP client 316.

The login screen 501 includes the checkbox 509 for selecting whether or not to use the auto login function from the next time. In the case where the user performs login in a state where the checkbox 509 is checked, the document management login system 308 stores the issued session ID in the cookie 317 in the tablet terminal 102 without setting a validity period. The document management login system 308 also manages the session ID in the RAM 203 as the information of the currently login user in association with the information of the user logging in, and stores the session ID in a session management DB 311 in the HDD 204. Information 603 shown in FIG. 6 is an example of information recorded in the session management DB 311.

In the case where the user performs login in a state where the checkbox 509 is not checked, the document management login system 308 stores the issued session ID in the cookie 317 in the tablet terminal 102 so as to be discarded when the HTTP client 316 ends. The document management login system 308 also manages the session ID in the RAM 203 as the information of the currently login user, in association with the information of the user logging in. Here, the document management login system 308 does not store the issued session ID in the session management DB 311 in the HDD 204.

(Auto Login Function During Access from Tablet Terminal)

The document management login system 308 obtains the session ID stored in the cookie 317 in the tablet terminal 102, via the HTTP server 307 and the HTTP client 316. In the case where the obtainment of the session ID is successful, the document management login system 308 checks whether or not the obtained session ID is included in the session IDs managed in the RAM 203. In the case where the obtained session ID is included in the session IDs managed in the RAM 203, the document management login system 308 determines that the user is currently logging in. In the case where the obtained session ID is not included in the session IDs managed in the RAM 203, the document management login system 308 refers to the session management DB 311 in the HDD 204. In the case where the obtained session ID is included in the session management DB 311, the document management login system 308 obtains the session ID and the user information associated with the session ID, and manages them in the RAM 203 as the information of the currently login user.

(Logout Process During Access from Tablet Terminal)

The logout process through HTTP communication corresponds to the discard of the session ID held in either one or both of the client and the server. For example, the client and the server discard the session ID in the following conditions.

Discard the session ID in the case where the document management login system 308 detects the press of the logout button.

Discard the session ID stored in the cookie 317 so as to be discarded when the HTTP client 316 ends, in the case where the user who operates the tablet terminal 102 ends the document management client application 315.

Discard the session ID in the RAM 203 in the case where the session ID managed in the RAM 203 by the document management login system 308 has not been used for a predetermined time.

[Flowchart]

Figure 7:
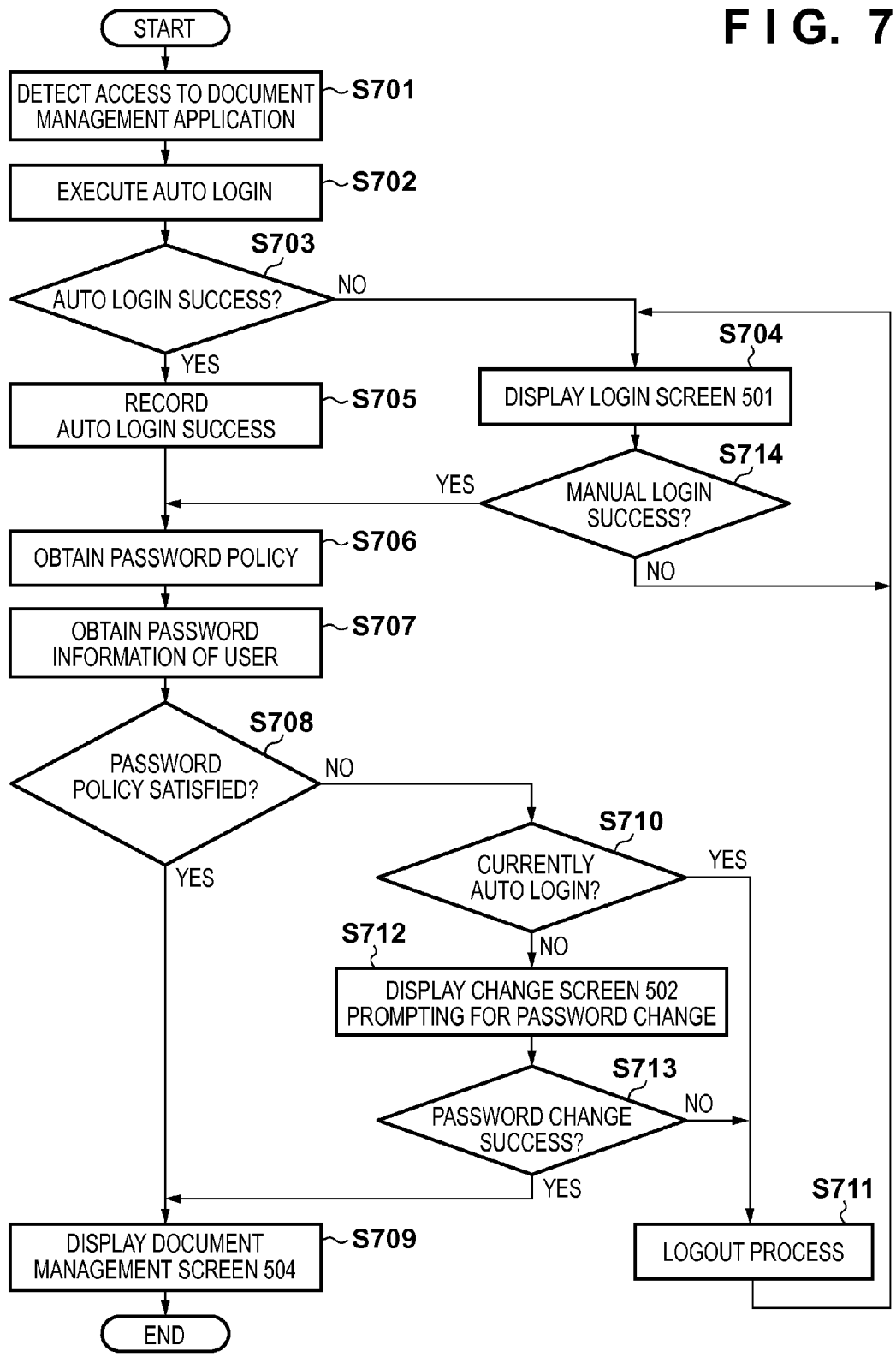
FIG. 7 is a flowchart showing the operation of a document management login system according to a first embodiment.

The following describes the processes related to auto login, manual login, and password change according to the present invention, with reference to a flowchart in FIG. 7. The following procedure is the same in the case of user access from the operation unit 209 in the MFP 101 and in the case of user access from the operation unit (not shown) in the tablet terminal 102 via the HTTP server 307. The CPU included in each apparatus executes the following processes, unless stated otherwise.

In step S701, the document management login system 308 starts the login process, in the case of detecting user access in a state where currently login user information is not held in the RAM 203. In step S702, the document management login system 308 executes the auto login function. In step S703, the document management login system 308 determines whether or not the process of the auto login function in step S702 is successful.

In the case where the auto login fails (step S703: NO), in step S704 the document management login system 308 switches to the manual login function and displays the login screen 501. In the case where the auto login is successful (step S703: YES), in step S705 the document management login system 308 records the auto login success in the RAM 203. After the successful auto login, in step S706 the document management login system 308 obtains the password policy recorded in the password policy DB 310. In step S707, the document management login system 308 obtains the password information of the user who has succeeded in the login.

In step S708, the document management login system 308 determines whether or not the obtained password information of the user satisfies the password policy. In detail, the document management login system 308 determines whether or not the complexity of the password satisfies the specified setting, whether or not the validity period of the password exceeds the specified period, and the like, according to the set password policy. In the case where the password policy has been updated, there is a possibility that the set password satisfies the previous password policy but does not satisfy the updated password policy. In the case where the password information of the user satisfies the password policy (step S708: YES), in step S709 the document management login system 308 notifies the document management unit 312 of the currently login user information and displays the document management screen 504.

In the case where the password information of the user does not satisfy the password policy (step S708: NO), in step S710 the document management login system 308 determines whether or not the information of the auto login success is stored in the RAM 203 (that is, whether or not the user is currently auto login). This realizes login determination unit for determining whether the login state derives from the auto login function or the manual login function. In the case where the user is currently auto login (step S710: YES), in step S711 the document management login system 308 performs the logout process for the document management application 306. In detail, the document management login system 308 discards the currently login user information recorded in the RAM 203 when the auto login is successful in step S703 and the information of the auto login success recorded in step S705.

After the logout process in step S711, in step S704 the document management login system 308 switches to the manual login function and displays the login screen 501. In the case where the user performs the login operation through the login screen 501, in step S714 the document management login system 308 checks whether or not the process of the manual login function is successful. In the case where the manual login is successful (step S714: YES), the document management login system 308 proceeds to step S706 as in the auto login process.

In the case where the user is not currently auto login (step S710: NO), in step S712 the document management login system 308 determines that the login has been manually performed, and displays the change screen 502 prompting for the password change for the document management application 306. In step S713, the document management login system 308 determines whether or not the password change is successful. In the case where the changed password satisfies the password policy and the user has appropriately performed the password change operation (step S713: YES), in step S709 the document management login system 308 notifies the document management unit 312 of the currently login user information. The document management unit 312 accordingly displays the document management screen 504. In the case where the user has canceled the password change process (step S713: NO), in step S711 the document management login system 308 performs the logout process. In this embodiment, the logout process is forcefully performed in the case where the password is not changed, on the ground that the password change is mandatory.

As described above, even in the case where the auto login function is on, the change screen 502 prompting for the password change is kept from being suddenly displayed on the operation unit during access to the document management application 306. Since the user always performs manual login before the display of the change screen 502 prompting for the password change, the user can shift to the change screen 502 while being aware of the login function. This causes no confusion on the user when changing the password of the login function.

In the first embodiment, the tablet terminal 102 or the document management client application 315 that accesses the document management application 306 through HTTP is an example of the client. For example, the client may use a personal computer instead of the tablet terminal 102. The client may also use a general-purpose web browser instead of a dedicated application such as the document management client application 315. In the first embodiment, the MFP 101 is an example of the terminal having login function. The present invention may also be used for login function for websites accessible via the Internet.

In the first embodiment, in the case of determining that the password policy is not satisfied (steps S706 to S708) after auto login (step S702), the logout process is performed (step S711) and then manual login is performed (steps S704, S714). As an alternative, the following process may be performed. Whether or not the password policy is satisfied is determined before auto login, and auto login is restricted and only manual login is permitted if the password policy is not satisfied. In other words, steps S706 to S708 are performed before step S702, and whether auto login is permitted or restricted is determined according to the result of step S708.

Second Embodiment

In the first embodiment, in a situation where the password change is required when auto login is performed, the login is canceled and the operation is switched to manual login, so as to keep the change screen prompting for the password change from being suddenly displayed after auto login.

In the second embodiment, the change screen 503 prompting for the password change specific to auto login may be displayed, instead of switching the operation to manual login. In this case, the change screen 502 prompting for the password change, which is displayed after manual login, may be simplified.

Figure 8:
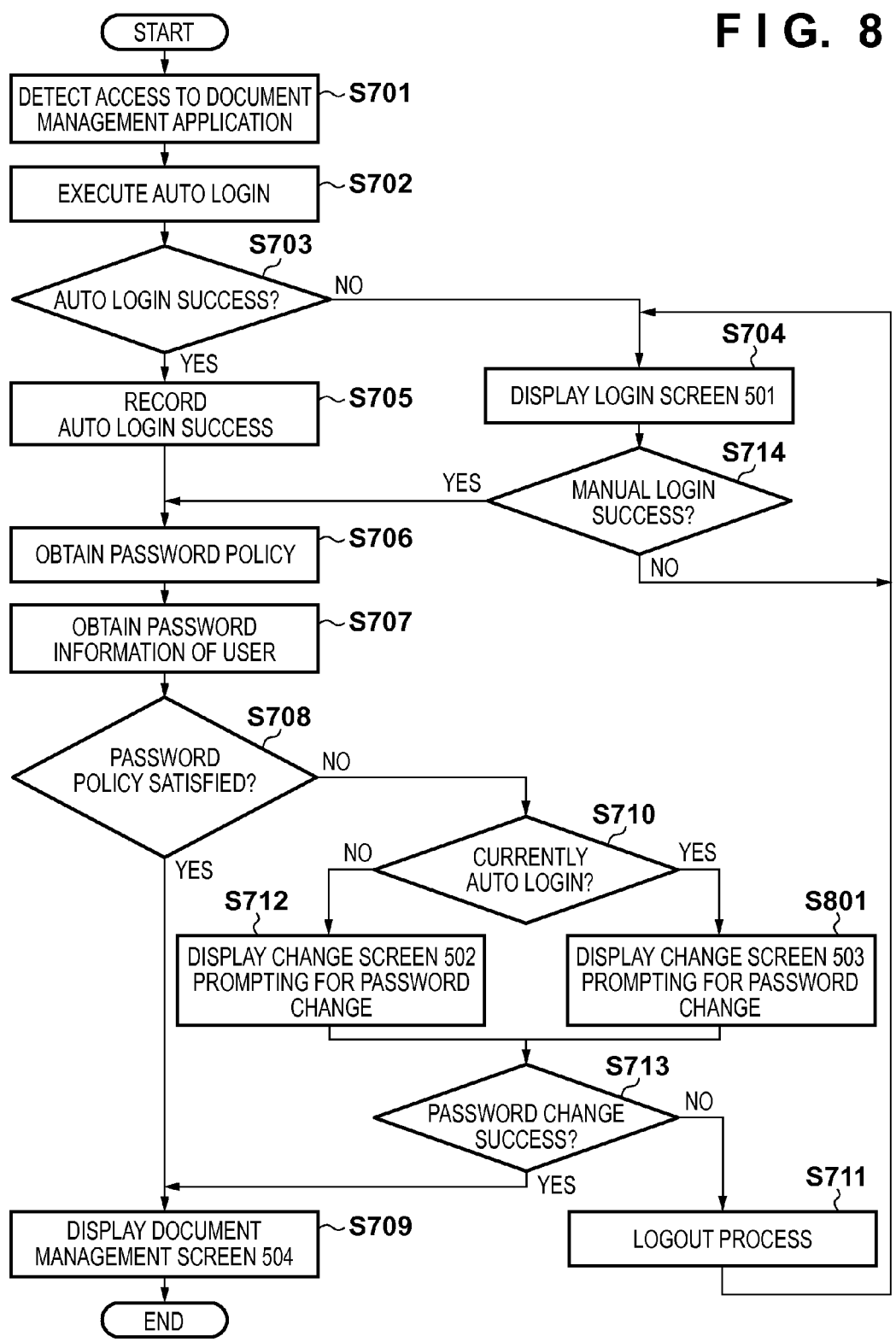
FIG. 8 is a flowchart showing the operation of a document management login system according to a second embodiment.

Such information that enables the user to change the password without confusion is added to the change screen 503 prompting for the password change which is displayed after auto login. For example, the change screen 503 may include the information of the application as the login destination and the user name corresponding to the password, as shown in FIG. 5A. FIG. 8 is a flowchart in the case where a different change screen is displayed depending on whether or not the user is currently auto login.

The description of the same processes in FIG. 8 as in FIG. 7 is omitted, and only the differences are described below. In step S710, the document management login system 308 determines whether or not the information of the auto login success is stored in the RAM 203 (that is, whether or not the user is currently auto login). In the case where the auto login is successful (step S710: YES), in step S801 the document management login system 308 displays the change screen 503 prompting for the password change. In the case where the information of the auto login success is not stored (step S710: NO), in step S712 the document management login system 308 determines that the login has been performed by the manual login function, and displays the change screen 502 prompting for the password change. After the process in step S801 or S712, in step S713 the document management login system 308 determines whether or not the password change is successful. The subsequent processes are the same as those in the first embodiment.

The structure of using different change screens prompting for the password change in this embodiment can achieve the same advantageous effects as in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001959, filed Jan. 8, 2014, which is hereby incorporated by reference herein in its entirety.

What is claimed is:

1. An information processing apparatus comprising:
a memory device that stores a set of instructions; and
at least one processor coupled to the memory device,
   wherein the processor executes instructions, of the set of instructions, to:
   display a login screen for first login software, and perform user authentication using user information input through the login screen for the first login software;
   perform, based on the user information input via the login screen for the first login software, user authentication for second login software, without displaying a login screen for the second login software; and display the login screen for the second login software, in a case where a user credential used for the user authentication for the second login software is required to be changed.

2. The information processing apparatus according to claim 1, wherein the instructions further comprise instructions to display a change screen for the user credential used for the user authentication for the second login software, in the case where the user credential is required to be changed.

3. The information processing apparatus according to claim 2, wherein the instructions further comprise instructions to display the change screen, after login manipulation is performed via the login screen for the second login software.

4. The information processing apparatus according to claim 1, wherein the instructions further comprise instructions to:

determine, after the login processing for the second login software is performed, whether or not the user credential used for the user authentication for the second login software is required to be changed;

perform, in a case where it is determined that the user credential used for the user authentication for the second login software is required to be changed, logout processing for the second login software; and display, after the logout processing is performed, the login screen for the second login software.

5. The information processing apparatus according to claim 1, wherein the first login software is login software for logging into the information processing apparatus, and the second login software is login software for logging into an application stored by the information processing apparatus.

6. The information processing apparatus according to claim 1, wherein the instructions further comprise instructions to manage the user credential used for the user authentication for the second login software in association with the user information used for the user authentication for the first login software.

7. An information processing apparatus comprising:

at least one processor and memory coupled to each other and cooperating to act as:

a first login unit configured to display a login screen, and to perform user authentication using user information input through the login screen;

a second login unit configured to perform user authentication using information input through the login screen, without displaying the login screen;

a determination unit configured to determine whether or not a credential included in user information of a user logging in is required to be changed; and a display unit configured to display a change screen for the credential, in the case where the determination unit determines that the credential is required to be changed, wherein the display unit displays a different change screen, depending on whether the login was performed by the first login unit or the second login unit.

8. The information processing apparatus according to claim 7, wherein the display unit displays the change screen in which the user information and information related to a login destination are included in more detail, in the case where the login has been performed by the second login unit than in the case where the login has been performed by the first login unit.

9. The information processing apparatus according to claim 7, wherein the at least one processor and memory further cooperate to act as a management unit configured to manage a policy indicating a condition when setting the credential, and the determination unit determines that the credential is required to be changed, in the case where the credential does not satisfy the policy.

10. The information processing apparatus according to claim 9, wherein the policy includes at least any of setting items about the number of characters of the credential, a character of the credential, a validity period of the credential, and whether or not to change an initial credential.

11. The information processing apparatus according to claim 7, wherein user authentication in the information processing apparatus is classified as user authentication when using the information processing apparatus and user authentication when using an application included in the information processing apparatus, and the second login unit and the first login unit are used for the user authentication when using the application included in the information processing apparatus.

12. The information processing apparatus according to claim 7, wherein the login screen displayed by the first login unit has a structure for issuing an instruction to permit the user authentication by the second login unit using input user information, and the second login unit performs the user authentication using user information previously input through the login screen, when instructed via the structure.

13. The information processing apparatus according to claim 7, wherein, in the case of performing the user authentication in response to a request from an external terminal, the second login unit performs the user authentication using a session ID issued upon success of previous user authentication.

14. An information processing method comprising:

displaying a login screen for first login software, and performing user authentication using user information input through the login screen;

performing, based on the user information input via the login screen for the first login software, user authentication for second login software, without displaying a login screen for the second login software; and displaying the login screen for the second login software, in a case where a user credential used for the user authentication for the second login software is required to be changed.

15. An information processing method comprising:

a first login step of displaying a login screen, and performing user authentication using user information input through the login screen;

a second login step of performing user authentication using information input through the login screen, without displaying the login screen;

a determination step of determining whether or not a credential included in user information of a user logging in is required to be changed; and a display step of displaying a change screen for the credential, in the case of determining in the determination step that the credential is required to be changed, wherein in the display step, a change screen is displayed, depending on whether the login was performed in the first login step or the second login step.

16. A non-transitory computer-readable medium storing a program for causing a computer to function as:

a first login unit configured to display a login screen for first login software, and to perform user authentication using user information input through the login screen;

a second login unit configured to perform, based on the user information input via the login screen for the first login software, user authentication for second login software, without displaying a login screen for the second login software; and a display unit configured to display the login screen for the second login software, in a case where a user credential used for the user authentication for the second login software is required to be changed.

17. A non-transitory computer-readable medium storing a program for causing a computer to function as:

a first login unit configured to display a login screen, and to perform user authentication using user information input through the login screen;

a second login unit configured to perform user authentication using information input through the login screen, without displaying the login screen;

a determination unit configured to determine whether or not a credential included in user information of a user logging in is required to be changed; and a display unit configured to display a change screen for the credential, in the case where the determination unit determines that the credential is required to be changed, wherein the display unit displays a different change screen, depending on whether the login was performed by the first login unit or the second login unit.

* * * * *